United States Patent
Liu et al.

(10) Patent No.: US 12,361,184 B2
(45) Date of Patent: Jul. 15, 2025

(54) THERMAL COMPENSATION DESIGN AND IMPLEMENTATION METHOD FOR A NEAR-NET-SHAPE (NNS) MOLDING OF THERMOSET COMPOSITE PART BASED ON TEMPERATURE FIELD AND CURING DEGREE FIELD

(71) Applicant: NORTH UNIVERSITY OF CHINA, Taiyuan (CN)

(72) Inventors: Yaqing Liu, Taiyuan (CN); Qihui Chen, Taiyuan (CN); Chaoyang Wu, Taiyuan (CN); Guizhe Zhao, Taiyuan (CN)

(73) Assignee: NORTH UNIVERSITY OF CHINA, Taiyuan (CN)

( * ) Notice: Subject to any disclaimer, the term of this patent is extended or adjusted under 35 U.S.C. 154(b) by 0 days.

(21) Appl. No.: 19/024,439

(22) Filed: Jan. 16, 2025

(65) Prior Publication Data
US 2025/0156590 A1 May 15, 2025

Related U.S. Application Data

(63) Continuation of application No. PCT/CN2024/074042, filed on Jan. 25, 2024.

(30) Foreign Application Priority Data

Jan. 18, 2024 (CN) .............................. 202410071351

(51) Int. Cl.
*C08J 5/24* (2006.01)
*B29C 35/02* (2006.01)
(Continued)

(52) U.S. Cl.
CPC .......... *G06F 30/10* (2020.01); *B29C 35/0288* (2013.01); *B29C 70/54* (2013.01);
(Continued)

(58) Field of Classification Search
CPC . G06F 30/10; G06F 2119/08; B29C 35/0288; B29C 70/54; C08J 5/243;
(Continued)

(56) References Cited

U.S. PATENT DOCUMENTS

2013/0307191 A1* 11/2013 Polk, Jr. .................. B29C 48/07
264/328.2
2022/0108053 A1 4/2022 Daware et al.

FOREIGN PATENT DOCUMENTS

CN 113011060 A 6/2021
CN 115648496 A * 1/2023
(Continued)

*Primary Examiner* — Michael J Dalbo
*Assistant Examiner* — Denise R Karavias

(57) ABSTRACT

A thermal compensation design and implementation method for near-net-shape molding of a thermoset composite part based on temperature and curing degree fields is provided. A minimum symmetric unit model is established based on sizes of the part and a mold and ambient temperature. A curing kinetic model and a heat transfer model are established. A molding temperature curve is written into a subprogram. A simulated thermal compensation is performed on a region whose temperature is lower than a molding temperature with a difference of greater than or equal to 5% of the molding temperature until the temperature difference of individual regions is less than 5% of the molding temperature. The simulated thermal compensation is then performed on those regions with a curing degree less than or equal to 0.9. A thermal compensation device is assembled according to the thermal compensation scheme for experimental verification.

9 Claims, 5 Drawing Sheets
(1 of 5 Drawing Sheet(s) Filed in Color)

(51) Int. Cl.
  *B29C 70/54*       (2006.01)
  *G06F 30/10*       (2020.01)
  *G06F 119/08*      (2020.01)
  *B29K 63/00*       (2006.01)
  *B29K 105/08*      (2006.01)
  *B29K 307/04*      (2006.01)

(52) U.S. Cl.
  CPC ............ *C08J 5/243* (2021.05); *B29K 2063/00* (2013.01); *B29K 2105/0809* (2013.01); *B29K 2307/04* (2013.01); *C08J 2363/00* (2013.01); *G06F 2119/08* (2020.01)

(58) Field of Classification Search
  CPC ............. C08J 2363/00; B29K 2063/00; B29K 2105/0809; B29K 2307/04
  See application file for complete search history.

(56) References Cited

FOREIGN PATENT DOCUMENTS

| CN | 116665821 A | * | 8/2023 |
| CN | 116779067 A | | 9/2023 |
| CN | 118094981 A | | 5/2024 |

\* cited by examiner

THERMAL COMPENSATION DESIGN AND IMPLEMENTATION METHOD FOR A NEAR-NET-SHAPE (NNS) MOLDING OF THERMOSET COMPOSITE PART BASED ON TEMPERATURE FIELD AND CURING DEGREE FIELD

CROSS-REFERENCE TO RELATED APPLICATIONS

This application is a continuation of International Patent Application No. PCT/CN2024/074042, filed on Jan. 25, 2024, which claims the benefit of priority from Chinese Patent Application No. 202410071351.5, filed on Jan. 18, 2024. The content of the aforementioned application, including any intervening amendments thereto, is incorporated herein by reference in its entirety.

TECHNICAL FIELD

This application relates to molding technologies of fiber-reinforced resin matrix composites, and more specifically to a thermal compensation design and implementation method for a near-net-shape (NNS) molding of a thermoset composite part based on a temperature field and a curing degree field.

BACKGROUND

Fiber-reinforced resin matrix composites, which are made by compositing a resin (e.g., epoxy resins, phenolic resins, polyimide resins, cyanoacrylate resins, etc.) with a fiber (e.g., glass fibers, carbon fibers, ultra-high molecular weight polyethylene fibers, etc.), have been widely used in many fields that require good mechanical properties and weight reduction due to their remarkable specific strength and specific stiffness. The strength and integrity of the final composite parts depend greatly on the distribution uniformity of the temperature field and the curing degree field during the curing process. Considering the great demand for fiber-reinforced resin matrix composites in the national defense and national economy, it is urgent to study the distribution of the temperature field and the curing degree field of these composites during the curing process, so as to find an effective control strategy, thereby arriving at the preparation of high-quality NNS molded parts.

At present, the molding of the fiber-reinforced resin matrix composites is performed mainly by a semi-empirical pure resin curing process. However, for structurally-complex parts or parts with a large thickness, the distribution of the temperature field during the molding process is non-uniform, and the temperature difference will cause the thermal strain and the curing shrinkage strain of the composite, ultimately resulting in curing deformation and performance degradation of the manufactured parts. In the prior art, research focus is to find a solution to mitigate the temperature field difference on the mold surface caused by the heat exchange with external ambient temperature, and less attention has been paid to the temperature field distribution of composites during molding process. Therefore, how to optimize the internal temperature field of composites through thermal compensation is of important research significance.

In conclusion, the development of economic and efficient methods for thermal compensation of molding process of fiber-reinforced resin matrix composites has important practical significance and application value.

SUMMARY

An objective of the present disclosure is to provide a thermal compensation design and implementation method for a near-net-shape (NNS) molding of a thermoset composite part based on a temperature field and a curing degree field to overcome the defect in the prior art that there is a lack of an approach for optimizing the uniformity of the temperature field and the curing degree field inside the composite during the molding process through thermal compensation.

Technical solutions of the present disclosure are described below.

This application provides a thermal compensation design and implementation method for a near-net-shape (NNS) molding of a thermoset composite part based on a temperature field and a curing degree field, wherein the thermoset composite part is made of a thermoset composite comprising a thermoset resin matrix and a fiber-reinforced phase; and the thermal compensation design and implementation method comprises:

(S1) establishing a minimum symmetric unit model based on a size of the thermoset composite part, a size of a mold of the thermoset composite part, and an ambient temperature;

(S2) performing, by a differential scanning calorimeter, a non-isothermal testing on the thermoset resin matrix; establishing a reaction rate-temperature relationship of the thermoset resin matrix during a curing process according to a change in heat flow rate; and establishing a curing kinetic model based on the reaction rate-temperature relationship;

(S3) measuring parameters required for a heat transfer analysis to establish a heat transfer model during the NNS molding process;

(S4) writing a molding temperature curve into a subprogram, wherein in a first calculation process, the molding temperature curve is a molding temperature curve of the thermoset resin matrix, and in a subsequent design of a thermal compensation, the molding temperature curve is a corrected molding temperature curve of the thermoset resin matrix, wherein the corrected molding temperature curve considers a thermal compensation introduced to a first thermal compensation region of the thermoset composite;

(S5) performing a thermo-chemical coupled analysis on the thermoset composite to obtain a temperature field distribution procedure and a curing degree field distribution procedure of the thermoset composite during the NNS molding process;

(S6) based on the temperature field distribution procedure and the curing degree field distribution procedure obtained in step (S5), performing a simulated thermal compensation on the first thermal compensation region during the NNS molding process in which a temperature of the first thermal compensation region is lower than a molding temperature with a temperature difference greater than or equal to 5% of the molding temperature;

repeating steps (S4) and (S5) based on the corrected molding temperature curve of the thermoset resin matrix until the difference between temperatures of all regions and a current molding temperature is lower than 5% of the current molding temperature, so as to satisfy design requirements of a temperature field distribution and obtain a first simulated thermal compensation design program; and if a curing degree of the thermoset composite during the NNS molding process in the first simulated thermal compensation program is less than or equal to 0.9, regarding corresponding area as a second thermal compensation area and optimizing the first simulated thermal compensation program based on a curing degree field by increasing a temperature of the second thermal compensation region to enhance the curing degree of the thermoset composite until the curing degree is greater than 0.9, so that a simulated thermal compensation design scheme that satisfies the design requirements of the temperature field distribution and design requirements of the curing degree field at the same time is obtained;

(S7) assembling a thermal compensation device based on the simulated thermal compensation design scheme obtained in step (S6); and measuring a temperature evolution procedure of the first thermal compensation region and the second thermal compensation region during the NNS molding process through a buried temperature sensor; and (S8) when a difference between a measured temperature value and a simulated temperature value obtained from the simulated thermal compensation design scheme is greater than or equal to 5% of the simulated temperature value, optimizing the thermal compensation device until the difference between the measured temperature value and the simulated temperature value is less than 5% of the simulated temperature value, so as to arrive at a desired thermal compensation design scheme and implementation method.

In an embodiment, in step (S2), the curing kinetic model is established by using a curing phenomenological kinetic model, and the curing phenomenological kinetic model is represented by:

$$\frac{d\alpha}{dt} = K(T)f(\alpha);$$

wherein $\alpha$ represents a curing degree of the thermoset resin matrix; $K(T)$ represents a curing rate constant of the thermoset resin matrix; and $f(\alpha)$ represents a curing mechanism function; t represents a curing time;

the curing rate constant $K(T)$ of the thermoset resin matrix is expressed using an Arrhenius equation:

$$K(T) = A_0 \exp\left(-\frac{E}{RT}\right);$$

wherein $A_0$ represents a pre-exponential factor; E represents an activation energy constant; R represents a universal gas constant; and T represents an absolute temperature; and the curing degree $\alpha$ of the thermoset resin matrix is expressed as:

$$\alpha = \int_t K(T)f(\alpha)d(t).$$

In an embodiment, in step (S3), the heat transfer model is established through steps of:

(1) determining a heat transfer mode between the thermoset composite and environment to be a third-type temperature boundary condition; and determining a heat transfer between the thermoset composite and the mold through thermal conduction;

(2) measuring to-be-input parameters, wherein the to-be-input parameters comprise a density $\rho$ of the thermoset composite, a density $\rho_r$ of the thermoset resin matrix, a specific heat capacity c of the thermoset composite, a heat transfer coefficient k, a convective heat transfer coefficient, and a thermal radiation coefficient; and (3) performing the heat transfer analysis using a three-dimensional nonlinear heat transfer equation, expressed as:

$$\rho c \frac{\partial T}{\partial t} = \frac{\partial}{\partial x}\left(k_x \frac{\partial T}{\partial x}\right) + \frac{\partial}{\partial y}\left(k_y \frac{\partial T}{\partial y}\right) + \frac{\partial}{\partial z}\left(k_z \frac{\partial T}{\partial z}\right) + Q;$$

wherein $\rho$ and c are the density and the specific heat capacity of the thermoset composite part, respectively; $k_x$, $k_y$, and $k_z$ are heat transfer coefficients in x-axis, y-axis, and z-axis directions, respectively; and Q represents a heat released by a curing reaction of the thermoset resin matrix, expressed as:

$$Q = \rho_r(1 - v_f)H_R \frac{d\alpha}{dt};$$

wherein $v_f$ represents a volume fraction of the fiber-reinforced phase; $\rho_r$ represents a density of the thermoset resin matrix; and $H_R$ represents a heat released per unit weight of the thermoset resin matrix through the curing reaction.

In an embodiment, in step (S4), the subprogram is a program written for secondary development of Abaqus finite element.

In an embodiment, in step (S5), the thermo-chemical coupled analysis further comprises:

subjecting a model of the thermoset composite part and a model of the mold obtained in step (S1) to meshing; wherein mesh sizes in a length direction and a width direction of the thermoset composite part are both less than or equal to 2% of a total size of the thermoset composite part, and a number of layers of meshes in a thickness direction of the thermoset composite part model is not less than 10.

In an embodiment, in step (S6), based on the temperatures of the regions obtained from results of the thermo-chemical coupled analysis, a difference between a temperature of each of the regions of the thermoset composite and the molding temperature is calculated using a Python script, and regions whose temperatures are lower than the molding temperature at a difference of greater than or equal to 5% of the molding temperature are screened for the first simulated thermal compensation design.

In an embodiment, the thermoset resin matrix is selected from the group consisting of an epoxy resin, a phenolic resin, an unsaturated polyester resin, and a combination thereof.

In an embodiment, the fiber-reinforced phase is selected from the group consisting of a carbon fiber, a quartz fiber, a glass fiber, a basalt fiber, an aramid fiber, an ultra-high molecular weight polyethylene (UHMWPE) fiber, a poly (p-phenylene benzobisoxazole) (PBO) fiber, and a combination thereof.

In an embodiment, in step (S7), the thermal compensation device is configured for:
- performing heat compensation on a surface of the mold corresponding to a region that requires thermal compensation by using a thermocouple as a heat source; and/or
- performing heat compensation on a region between the mold and the thermoset composite part that requires thermal compensation by using a film resistor as a heat source; and/or
- introducing a thermally-conductive filler to a region between layers of the thermoset composite part that requires thermal compensation to construct a thermal conduction network.

Compared with the prior art, the present disclosure has at least the following beneficial effects.

(1) The temperature field distribution of thermoset composite during the molding process is not uniform due to the influence of the heat released from the resin curing reaction and the environmental heat exchange. The difference in temperature distribution will lead to the difference in the curing reaction rate of the thermoset composite, which ultimately leads to the difference in thermal strain and curing shrinkage strain, thereby producing residual stress and affecting the quality of the obtained parts. In the present disclosure, by simulating and analyzing the temperature field and the curing degree field in the molding process of the thermoset composite, the thermal compensation is performed on the regions with large temperature differences, and then is performed the regions with curing degrees that do not meet the requirements, so that high-quality thermoset composite near-net molded parts can be obtained.

(2) In the present disclosure, the curing exothermic heat inside the thermoset composite and the heat exchange with the environment outside are effectively combined, which makes up for the defects of the existing temperature field analysis method that does not consider the internal heat generation in the thermoset composite part during the molding process.

(3) The thermal compensation method based on the distribution of the temperature field and the curing degree field provided in the present disclosure can reduce the blindness and dependence on experience of the commonly used traditional thermoset composite molding process, thereby reducing the trial-and-error cost of experimentation and production.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings herein, which are incorporated into and form a part of the specification, show embodiments in accordance with the present disclosure and are used in conjunction with the specification to explain the principles of the present disclosure.

To more clearly illustrate the technical solutions in the embodiments of the present disclosure or in the prior art, the accompanying drawings required to be used in the present disclosure or in the prior art will be briefly described below. Obviously, other accompanying drawings can be obtained by one of ordinary skill in the art from these drawings without creative labor.

Figure 1:
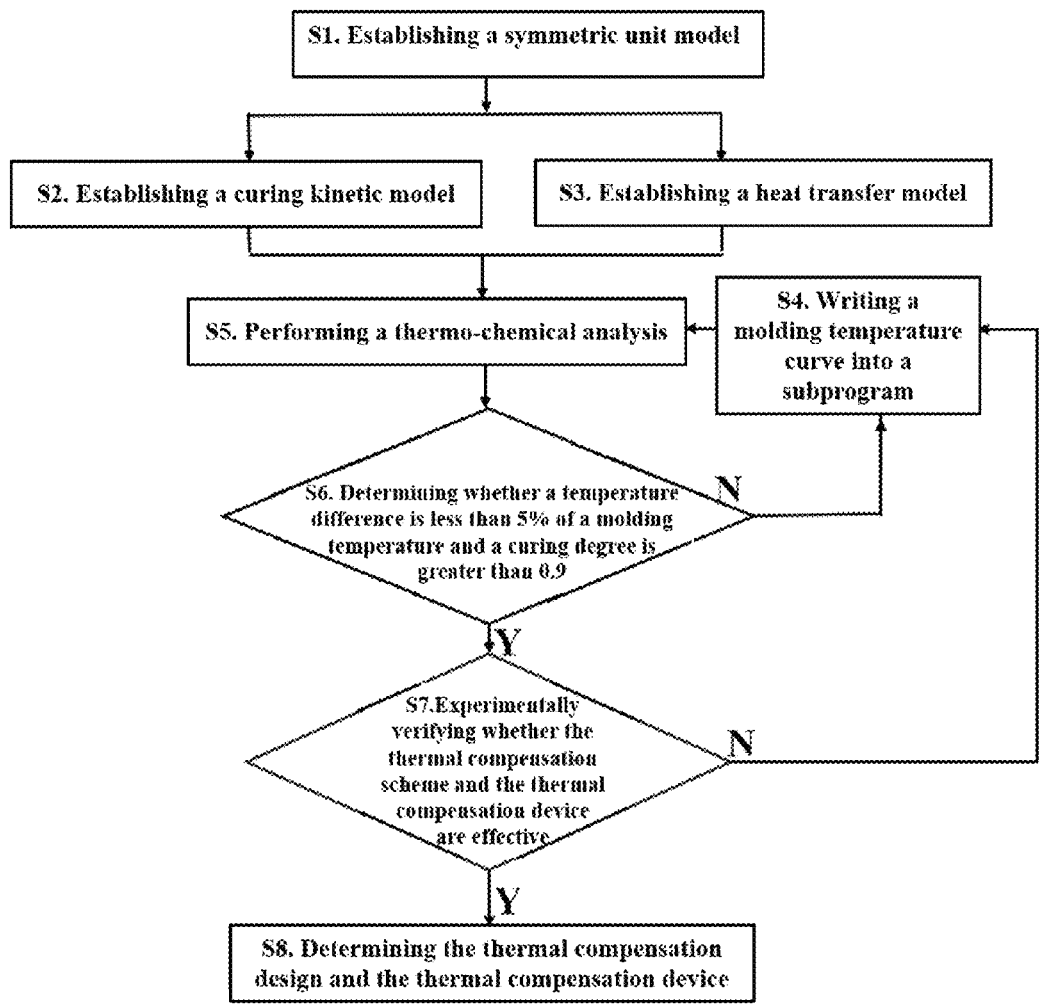
Figure 2:
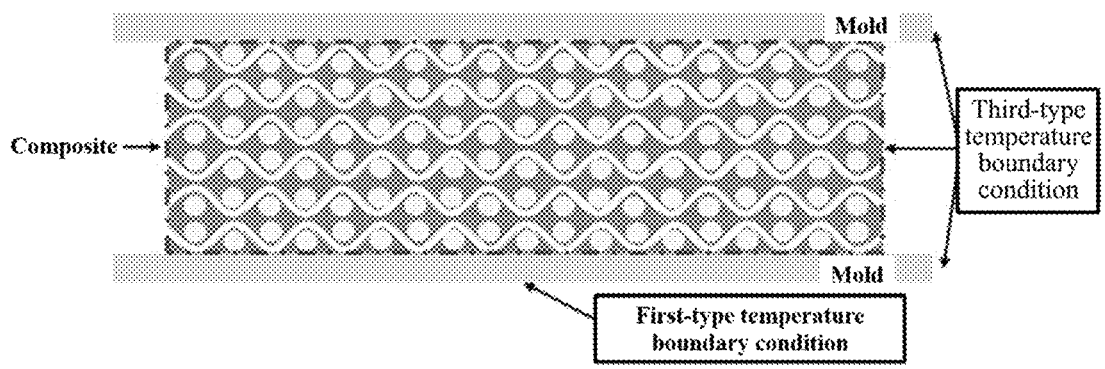
Figure 3:
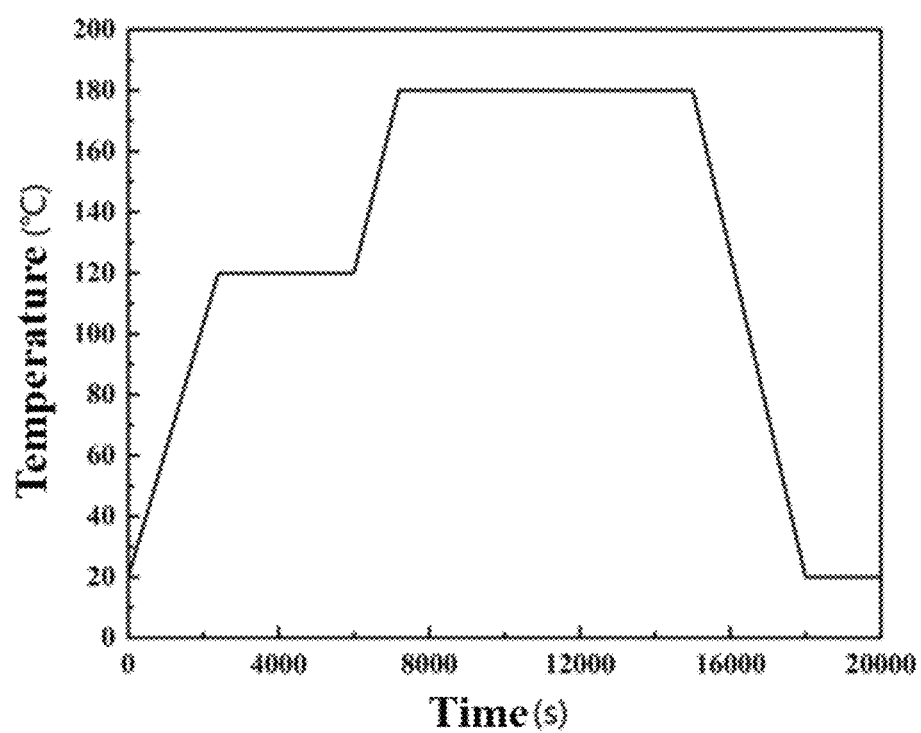
Figure 4:
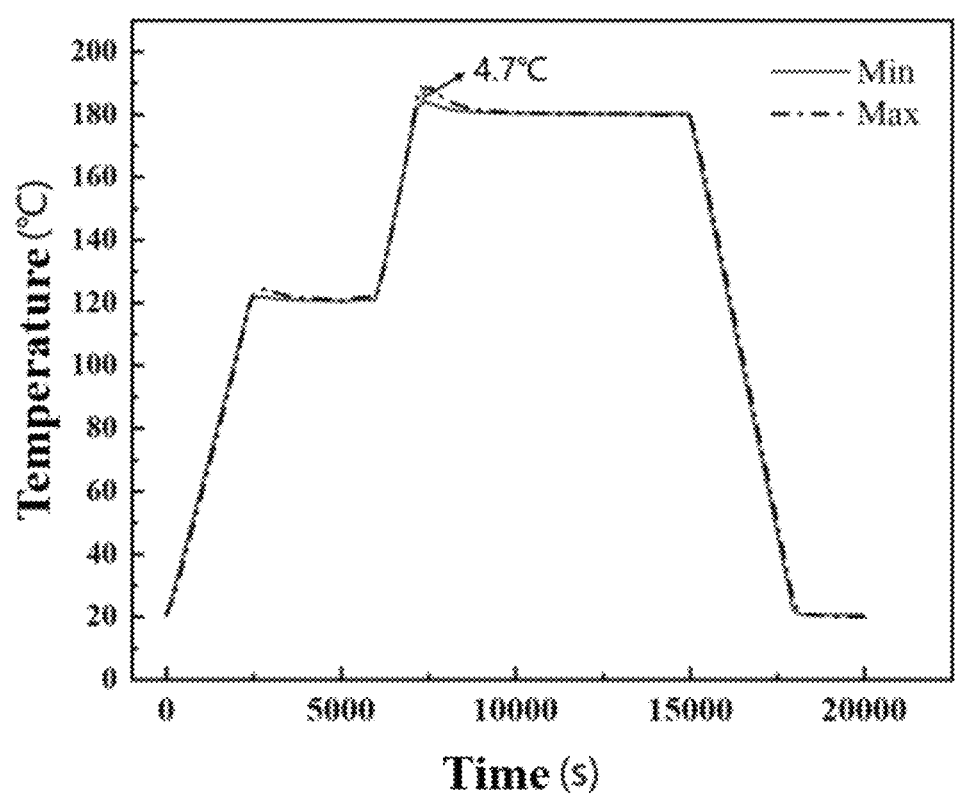
Figure 5:
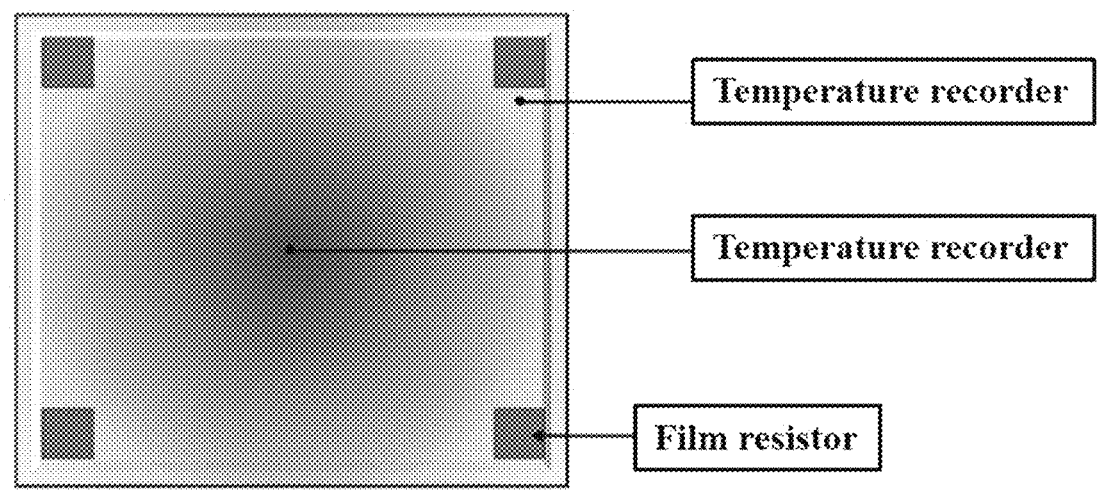

FIG. 1 is a flowchart of a thermal compensation design and implementation method for a thermoset composite part during a near-net molding process based on a temperature field and a curing degree field according to an embodiment of the present disclosure;

FIG. 2 schematically shows a model of a thermoset composite part and boundary conditions of Example 1 of the present disclosure;

FIG. 3 shows a temperature curve with time during a molding process of the thermoset composite part of Example 1 of the present disclosure;

FIG. 4 shows a temperature variation in a maximum temperature region and a minimum temperature region during a heat conduction process of Example 1 of the present disclosure; and FIG. 5 is a schematic diagram of an experimental verification in Example 1 of the present disclosure.

DETAILED DESCRIPTION OF EMBODIMENTS

To enable a clearer understanding of the above objects, features and advantages of the present disclosure, the embodiments of the present disclosure will be further described below. It is to be noted that the embodiments of the present disclosure and the features in the embodiments may be combined with each other without conflict.

Many specific details are set forth in the following description to better understand the present disclosure, but the present disclosure may also be practiced in other ways than those described herein. Obviously, the embodiments in the specification are only a part of the embodiments of the present disclosure.

This application provides a thermal compensation design and implementation method for a near-net-shape (NNS) molding of a thermoset composite part based on a temperature field and a curing degree field. The thermoset composite part includes a thermoset resin matrix and a fiber-reinforced phase. The thermal compensation design and implementation method includes the following steps.

(S1) A minimum symmetric unit model is established based on a size of the thermoset composite part, a size of a mold of the thermoset composite part, and an ambient temperature.

(S2) A non-isothermal testing is performed on the thermoset resin matrix by a differential scanning calorimeter. A reaction rate-temperature relationship of the thermoset resin matrix during a curing process is established according to a change in heat flow rate, and a curing kinetic model is established based on the reaction rate-temperature relationship.

(S3) Parameters required for a heat transfer analysis are measured to establish a heat transfer model during the NNS molding process.

(S4) A molding temperature curve is written into a subprogram, where in a first calculation process, the molding temperature curve is a molding temperature curve of the thermoset resin matrix, and in a subsequent design of a thermal compensation, the molding temperature curve is a corrected molding temperature curve of the thermoset resin matrix, wherein the corrected molding temperature curve considers a thermal compensation introduced to a first thermal compensation region of the thermoset composite.

(S5) A thermo-chemical coupled analysis is performed on the thermoset composite to obtain a temperature field distribution procedure and a curing degree field distribution procedure of the thermoset composite during the NNS molding process.

(S6) Based on the temperature field distribution procedure and the curing degree field distribution procedure obtained in step (S5), a simulated thermal compensation is performed on the first thermal compensation region during the NNS molding process, where a temperature of the first thermal compensation region is lower than a molding temperature with a temperature difference greater than or equal to 5% of the molding temperature. Steps (S4) and (S5) are repeated based on the corrected molding temperature curve of the thermoset resin matrix until the difference between temperatures of all regions and a current molding temperature is lower than 5% of the current molding temperature, so as to satisfy design requirements of a temperature field distribution and obtain a first simulated thermal compensation design program. If a curing degree of the thermoset composite during the NNS molding process in the first simulated thermal compensation program is less than or equal to 0.9, the corresponding area is regarded as a second thermal compensation area and the first simulated thermal compensation program is optimized based on a curing degree field by increasing a temperature of the second thermal compensation region to enhance the curing degree of the thermoset composite until the curing degree is greater than 0.9, so that a simulated thermal compensation design scheme that satisfies the design requirements of the temperature field distribution and design requirements of the curing degree field at the same time is obtained.

(S7) A thermal compensation device is assembled based on the simulated thermal compensation design scheme obtained in step (S6). A temperature evolution procedure of the first thermal compensation region and the second thermal compensation region is measured during the NNS molding process through a buried temperature sensor.

(S8) When a difference between a measured temperature value and a simulated temperature value obtained from the simulated thermal compensation design scheme is greater than or equal to 5% of the simulated measured temperature value, the thermal compensation device is optimized until the difference between the measured temperature value and the simulated temperature value is less than 5% of the simulated measured temperature value, so as to arrive at a desired thermal compensation design scheme and implementation method.

In an embodiment, in step (S2), the curing kinetic model is established by using a curing phenomenological kinetic model, and the curing kinetic phenomenological is represented by:

$$\frac{d\alpha}{dt} = K(T)f(\alpha);$$

where $\alpha$ represents a curing degree of the thermoset resin matrix; $K(T)$ represents a curing rate constant of the thermoset resin matrix; and $f(\alpha)$ represents a curing mechanism function; t represents a curing time.

The curing rate constant $K(T)$ of the thermoset resin matrix is expressed using an Arrhenius equation:

$$K(T) = A_0 \exp\left(-\frac{E}{RT}\right);$$

where $A_0$ represents a pre-exponential factor; E represents an activation energy constant; R represents a universal gas constant; and T represents an absolute temperature.

The curing degree $\alpha$ of the thermoset resin matrix is expressed as:

$$\alpha = \int_t K(T)f(\alpha)d(t).$$

In an embodiment, in step (S3), the heat transfer model is established through the following steps.

(1) A heat transfer mode is determined between the thermoset composite and environment to be a third-type temperature boundary condition, and a heat transfer is determined between the thermoset composite part and the mold through thermal conduction.

(2) To-be-input parameters are measured, where the to-be-input parameters include a density $\rho$ of the thermoset composite, a density $\rho_r$ of the thermoset resin matrix, a specific heat capacity c of the thermoset composite, a heat transfer coefficient k, a convective heat transfer coefficient, and a thermal radiation coefficient.

(3) A heat transfer analysis is performed using a three-dimensional nonlinear heat transfer equation, expressed as:

$$\rho c \frac{\partial T}{\partial t} = \frac{\partial}{\partial x}\left(k_x \frac{\partial T}{\partial x}\right) + \frac{\partial}{\partial y}\left(k_y \frac{\partial T}{\partial y}\right) + \frac{\partial}{\partial z}\left(k_z \frac{\partial T}{\partial z}\right) + Q;$$

where $\rho$ and c are the density and the specific heat capacity of the thermoset composite part, respectively; $k_x$, $k_y$, and $k_z$ are heat transfer coefficients in x-axis, y-axis, and z-axis directions, respectively; and Q represents a heat released by a curing reaction of the thermoset resin matrix, expressed as:

$$Q = \rho_r(1-v_f)H_R \frac{d\alpha}{dt};$$

where $v_f$ represents a volume fraction of the fiber-reinforced phase; $\rho_r$ represents a density of the thermoset resin matrix; and $H_R$ represents a heat released per unit weight of the thermoset resin matrix through the curing reaction.

In an embodiment, in step (S4), the subprogram is a program written for secondary development of Abaqus finite element.

In an embodiment, in step (S5), the thermo-chemical coupled analysis further includes the following steps.

A model of the thermoset composite part and a model of the mold obtained in step (S1) are subjected to meshing, where mesh sizes in a length direction and a width direction of the thermoset composite part are both less than or equal to 2% of a total size of the thermoset composite part, and a number of layers of meshes in a thickness direction of the thermoset composite part model is not less than 10.

In an embodiment, in step (S6), based on the temperatures of the regions obtained from results of the thermo-chemical coupled analysis, a difference between a temperature of each of the regions of the thermoset composite and the molding temperature is calculated using a Python script, and regions whose temperatures are lower than the molding temperature at a difference of greater than or equal to 5% of the molding temperature are screened as the first thermal compensation region.

In an embodiment, the thermoset resin matrix is selected from the group consisting of an epoxy resin, a phenolic resin, an unsaturated polyester resin, and a combination thereof.

In an embodiment, the fiber-reinforced phase is selected from the group consisting of a carbon fiber, a quartz fiber, a glass fiber, a basalt fiber, an aramid fiber, an ultra-high molecular weight polyethylene (UHMWPE) fiber, a poly (p-phenylene benzobisoxazole) (PBO) fiber, and a combination thereof.

In an embodiment, in step (S7), the thermal compensation device is configured for performing heat compensation on a surface of the mold corresponding to a region that requires thermal compensation by using a thermocouple as a heat source; and/or performing heat compensation on a region between the mold and the thermoset composite part that requires thermal compensation by using a film resistor as a heat source; and/or introducing a thermally-conductive filler to a region between layers of the thermoset composite part that requires thermal compensation to construct a thermal conduction network.

The following is the specific embodiment of the present disclosure.

EXAMPLE 1

A thermal compensation design and implementation method for a near-net-shape (NNS) molding of a thermoset composite part based on a temperature field and a curing degree field is provided, which includes the following steps.

(S1) The thermoset resin matrix of the thermoset composite part is E-51 epoxy resin, and the fiber-reinforced phase is carbon fiber cloth. A hot-pressing molding process is used herein. A mold size is 300*300*6 mm, and ⅛ area is selected according to its symmetric structure to establish a three-dimensional solid model (150*150*3 mm) as a minimum symmetric unit model.

(S2) A non-isothermal testing is performed on the epoxy resin by a differential scanning calorimeter to establish a curing kinetic model for the epoxy resin by testing heat flow changes of the epoxy curing reaction at different heating rates (5° C./min, 10° C./min, 15° C./min, and 20° C./min). The curing kinetic model is obtained by using a curing phenomenological kinetic model, and the curing phenomenological kinetic is represented by:

$$\frac{d\alpha}{dt} = K(T)f(\alpha);$$

where $\alpha$ represents a curing degree; $K(T)$ represents a cure rate constant of the thermoset resin matrix; and $f(\alpha)$ represents a cure mechanism function; t represents a curing time.

$$\frac{d\alpha}{dt} = (k_1 + k_2\alpha)(1-\alpha)(0.47-\alpha) \; \alpha \leq 0.3;$$

$$\frac{d\alpha}{dt} = k_3(1-\alpha) \; \alpha > 0.3; \text{ and}$$

$$k_i = A_i \exp\left(\frac{-\Delta E}{RT}\right) i = 1, 2, 3;$$

where $k_1$, $k_2$, and $k_3$ represent epoxy curing reaction constants; $A_i$ represents the pre-exponential factor ($A_1=1.98*10^9$, $A_2=-2.35*10^9$, $A_3=2.21*10^5$); $\Delta E$ represents the activation energy constant ($7.12*10^4$).

The change in the curing degree of the epoxy resin is expressed by:

$$\alpha_{t+\Delta t} = \alpha_t + \frac{d\alpha}{dt}\Delta t;$$

where $\alpha_t$ denotes a curing degree at moment t, and $\Delta t$ denotes each incremental step time.

(S3) Parameters required for a heat transfer analysis are measured to establish a heat transfer model during the NNS molding process, which includes the following steps.

(1) A heat transfer mode between the epoxy resin/carbon fiber cloth composite and the environment is set as a third-type temperature boundary condition, and a heat transfer between the epoxy resin/carbon fiber cloth composite material and the mold is heat conduction.

(2) To-be-input parameters are measured, where a density $\rho$ of the epoxy resin/carbon fiber cloth composite is 1680 kg/m³; a density $\rho_r$ of the epoxy resin is 1210 kg/m³; a specific heat capacity C of the epoxy resin/carbon fiber cloth composite material is 918 J/(kg·K); a volume fraction $V_f$ of the carbon fiber cloth is 60%; heat transfer coefficients $k_x$, $k_y$, and $k_z$ are 4.3 W/(K·m), 4.3 W/(K·m), and 0.4 W/(Km) respectively; and a thermal convection heat transfer coefficient is 5 W/(m²·k).

(3) A heat transfer analysis is performed using a three-dimensional nonlinear heat transfer equation, expressed as:

$$\rho c \frac{\partial T}{\partial t} = \frac{\partial}{\partial x}\left(k_x \frac{\partial T}{\partial x}\right) + \frac{\partial}{\partial y}\left(k_y \frac{\partial T}{\partial y}\right) + \frac{\partial}{\partial z}\left(k_z \frac{\partial T}{\partial z}\right) + Q;$$

where $\rho$ and c are the density and the specific heat capacity of the epoxy resin/carbon fiber cloth composite, respectively; $k_x$, $k_y$, and $k_z$ are heat transfer coefficients of the epoxy resin/carbon fiber cloth composite in x-axis, y-axis, and z-axis directions, respectively; and Q represents a heat released by a curing reaction of the epoxy resin matrix, expressed as:

$$Q = \rho_r(1-v_f)H_R\frac{d\alpha}{dt};$$

where $v_f$ represents a volume fraction of the carbon fiber cloth; $\rho_r$ represents a density of the epoxy resin; and $H_R$ represents a heat released per unit weight of the epoxy resin through the curing reaction.

According to the calculation, the heat $H_R$ released from the curing reaction of the epoxy resin matrix per unit weigh is 231 KJ/kg, and the curing degree α is 0.92-1. Then the analysis is carried out by using the three-dimensional non-linear heat transfer equation. According to the molding environment, the boundary conditions are shown in FIG. 2. The conduction coefficient between the mold and the epoxy resin/carbon fiber cloth composite material is $10^5$ W/(m²·k).

(S4) In a first calculation process, a molding temperature curve of the epoxy resin is written into a Abaqus subprogram.

(S5) A thermo-chemical coupled analysis is performed on the epoxy resin/carbon fiber cloth composite to obtain a temperature field distribution procedure and a curing degree field distribution procedure of the epoxy resin/carbon fiber cloth composite during the molding process. In the thermos-chemical coupled analysis, the mesh sizes of the epoxy/carbon fiber cloth composite are 0.5 mm in the length and width directions and 0.005 mm in the thickness direction.

(S6) Based on the temperature field distribution procedure and the curing degree field distribution procedure obtained in step (S5), it can be obtained that during the molding process, the temperature difference between the edge area and the center of the epoxy resin/carbon fiber cloth composite is 15.6° C. (more than 5% of the molding process temperature), so the edge area is selected for the first simulated thermal compensation region. The range of the simulated temperature compensation value is 10-20° C., and the first simulated compensation area is 20*20 mm, as shown in FIG. 4. Steps (S4) and (S5) are repeated for calculation and subsequent iterations for the first region requiring thermal compensation. The corrected molding process temperature curve of the epoxy resin matrix is programmed into the subroutine, and the temperature curve of the rest regions is still the epoxy resin molding process temperature curve. After the first simulated thermal compensation, the maximum temperature difference between each region and the current molding temperature is reduced to 4.7° C., and the temperature difference of all regions is lower than 5% of the current molding temperature, which meets the design requirements and is considered to be a first simulated thermal compensation design program. At this time, the degree of curing of the epoxy resin/carbon fiber cloth composite in the first thermal compensation scheme is 0.98-1, which meets the design requirements. As such, the simulated thermal compensation design scheme that satisfies both the temperature field and the degree of curing field is obtained.

(S7) A thermal compensation device is assembled based on the simulated thermal compensation design scheme obtained in step (S6). The thermal compensation device is a thin-film resistor (20*20 mm), which is placed in eight corner areas on the upper and lower surfaces of the epoxy resin/carbon fiber cloth composite, and temperature sensors are embedded in the corner areas and the center to test the temperature change during the molding process.

(S8) The difference between the measured temperature value and the simulated temperature value obtained from the simulated thermal compensation design scheme is within 1° C. and less than 5% of the simulated temperature. The final thermal compensation scheme is determined, where a thermal compensation range is 10-20° C.; a compensation area is 20*20 mm; and eight corner areas of the upper surface and the lower surface of the epoxy resin/carbon fiber cloth composite are each equipped with a 20*20 mm thin film resistor thermal compensation device.

The foregoing are only specific embodiments of the present disclosure to enable one of ordinary skill in the art to understand or realize the present disclosure. Although the present disclosure has been described in detail above, it should be understood that one of ordinary skill in the art can still modify the technical solutions disclosed in the preceding embodiments, or replace some or all of the technical features therein with equivalent ones. These modifications or replacements do not depart the essence of the technical solutions from the scope of the technical solutions of the corresponding embodiments, which shall be covered by the scope of protection of the appended claims.

What is claimed is:

1. A thermal compensation design and implementation method for a near-net-shape (NNS) molding of a thermoset composite part based on a temperature field and a curing degree field, the thermoset composite part being made of a thermoset composite comprising a thermoset resin matrix and a fiber-reinforced phase; and
the thermal compensation design and implementation method comprising:
(S1) establishing a minimum symmetric unit model based on a size of the thermoset composite part, a size of a mold of the thermoset composite part, and an ambient temperature;
(S2) performing, by a differential scanning calorimeter, a non-isothermal testing on the thermoset resin matrix; establishing a reaction rate-temperature relationship of the thermoset resin matrix during a curing process according to a change in heat flowrate; and establishing a curing kinetic model based on the reaction rate-temperature relationship;
(S3) measuring parameters required for a heat transfer analysis to establish a heat transfer model during the NNS molding process;
(S4) writing a molding temperature curve into a subprogram, wherein in a first calculation process, the molding temperature curve is a molding temperature curve of the thermoset resin matrix, and in a subsequent thermal compensation design, the molding temperature curve is a corrected molding temperature curve of the thermoset resin matrix, wherein the corrected molding temperature curve considers a thermal compensation introduced to a first thermal compensation region of the thermoset composite;
(S5) performing a thermo-chemical coupled analysis on the thermoset composite to obtain a temperature field distribution procedure and a curing degree field distribution procedure of the thermoset composite during the NNS molding process;
(S6) based on the temperature field distribution procedure and the curing degree field distribution procedure obtained in step (S5), performing a simulated thermal compensation on the first thermal compensation region during the NNS molding process, wherein a temperature of the first thermal compensation region is lower than a molding temperature with a temperature difference greater than or equal to 5% of the molding temperature;
repeating steps (S4) and (S5) based on the corrected molding temperature curve of the thermoset resin matrix until a difference between temperatures of all regions and a current molding temperature is lower than 5% of the current molding temperature, so as to satisfy design requirements of a temperature field distribution and obtain a simulated thermal compensation design program; and
if a curing degree of a certain area of the thermoset composite during the NNS molding process in the simulated thermal compensation design program is less than or equal to 0.9, regarding the area as a second thermal compensation region of the thermoset composite and optimizing the simulated thermal compensation design program based on a curing degree field by increasing a temperature of the second thermal compensation region to enhance the curing degree of the thermoset composite until the curing degree is greater than 0.9, so that a simulated thermal compensation design scheme that satisfies the design requirements of the temperature field distribution and design requirements of the curing degree field at the same time is obtained;

(S7) assembling a thermal compensation device based on the simulated thermal compensation design scheme obtained in step (S6); and measuring a temperature evolution procedure of the first thermal compensation region and the second thermal compensation region during the NNS molding process through a buried temperature sensor; and (S8) when a difference between a measured temperature value and a simulated temperature value obtained from the simulated thermal compensation design scheme is greater than or equal to 5% of the simulated temperature value, optimizing the thermal compensation device until the difference between the measured temperature value and the simulated temperature value is less than 5% of the measured temperature value, so as to arrive at a desired thermal compensation design scheme and implementation method.

2. The thermal compensation design and implementation method of claim 1, wherein in step (S2), the curing kinetic model is established by using a curing phenomenological kinetic model, and the curing phenomenological kinetic model is represented by:

$$\frac{d\alpha}{dt} = K(T)f(\alpha);$$

wherein α represents a curing degree of the thermoset resin matrix; K(T) represents a curing rate constant of the thermoset resin matrix; and f(α) represents a curing mechanism function; t represents a curing time;

the curing rate constant K (T) of the thermoset resin matrix is expressed using an Arrhenius equation:

$$K(T) = A_0 \exp\left(-\frac{E}{RT}\right);$$

wherein $A_0$ represents a pre-exponential factor; E represents an activation energy constant; R represents a universal gas constant; and T represents an absolute temperature; and the curing degree α of the thermoset resin matrix is expressed as:

$$\alpha = \int_t K(T)f(\alpha)d(t).$$

3. The thermal compensation design and implementation method of claim 1, wherein in step (S3), the heat transfer model is established through steps of:

(1) setting a heat transfer mode between the thermoset composite and environment to be a third-type temperature boundary condition; and determining a heat transfer between the thermoset composite and the mold through thermal conduction;

(2) measuring to-be-input parameters, wherein the to-be-input parameters comprise a density ρ of the thermoset composite, a density $\rho_r$ of the thermoset resin matrix, a specific heat capacity c of the thermoset composite, a heat transfer coefficient k, a convective heat transfer coefficient, and a thermal radiation coefficient; and (3) performing the heat transfer analysis using a three-dimensional nonlinear heat transfer equation, expressed as:

$$\rho c \frac{\partial T}{\partial t} = \frac{\partial}{\partial x}\left(k_x \frac{\partial T}{\partial x}\right) + \frac{\partial}{\partial y}\left(k_y \frac{\partial T}{\partial y}\right) + \frac{\partial}{\partial z}\left(k_z \frac{\partial T}{\partial z}\right) + Q;$$

wherein ρ and c are the density and the specific heat capacity of the thermoset composite, respectively; $k_x$, $k_y$, and $k_z$ are heat transfer coefficients in x-axis, y-axis, and z-axis directions, respectively; and Q represents a heat released by a curing reaction of the thermoset resin matrix, expressed as:

$$Q = \rho_r(1-v_f)H_R \frac{d\alpha}{dt};$$

wherein $v_f$ represents a volume fraction of the fiber-reinforced phase; $\rho_r$ represents a density of the thermoset resin matrix; and $H_R$ represents a heat released per unit weight of the thermoset resin matrix through the curing reaction.

4. The thermal compensation design and implementation method of claim 1, wherein in step (S4), the subprogram is a program written for secondary development of Abaqus finite element.

5. The thermal compensation design and implementation method of claim 1, wherein in step (S5), the thermo-chemical coupled analysis further comprises:
subjecting a model of the thermoset composite part and a model of the mold obtained in step (S1) to meshing;
wherein mesh sizes in a length direction and a width direction of the thermoset composite part are both less than or equal to 2% of a total size of the thermoset composite part, and a number of layers of meshes in a thickness direction of the thermoset composite part model is not less than 10.

6. The thermal compensation design and implementation method of claim 1, wherein in step (S6), based on the temperatures of the regions obtained from results of the thermo-chemical coupled analysis, a difference between a temperature of each of the regions of the thermoset composite and the molding temperature is calculated using a Python script, and regions whose temperatures are lower than the molding temperature at a difference of greater than or equal to 5% of the molding temperature are screened as the first thermal compensation region.

7. The thermal compensation design and implementation method of claim 1, wherein the thermoset resin matrix is selected from the group consisting of an epoxy resin, a phenolic resin, an unsaturated polyester resin, and a combination thereof.

8. The thermal compensation design and implementation method of claim 1, wherein the fiber-reinforced phase is selected from the group consisting of a carbon fiber, a quartz fiber, a glass fiber, a basalt fiber, an aramid fiber, an ultra-high molecular weight polyethylene (UHMWPE) fiber, a poly (p-phenylene benzobisoxazole) (PBO) fiber, and a combination thereof.

9. The thermal compensation design and implementation method of claim 1, wherein in step (S7), the thermal compensation device is configured for:

performing heat compensation on a surface of the mold corresponding to a region that requires thermal compensation by using a thermocouple as a heat source; and/or performing heat compensation on a region between the mold and the thermoset composite part that requires thermal compensation by using a film resistor as a heat source; and/or introducing a thermally-conductive filler to a region between layers of the thermoset composite part that requires thermal compensation to construct a thermal conduction network.

\* \* \* \* \*